US012723517B2

(12) United States Patent
Sibbach et al.

(10) Patent No.: US 12,723,517 B2
(45) Date of Patent: Sep. 1, 2026

(54) TURBINE ENGINE INCLUDING A FAN BLADE SENSOR SYSTEM

(71) Applicant: General Electric Company, Evendale, OH (US)

(72) Inventors: Arthur W. Sibbach, Boxford, MA (US); Brandon W. Miller, Middletown, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/821,449

(22) Filed: Aug. 30, 2024

(65) Prior Publication Data

US 2026/0063040 A1 Mar. 5, 2026

(51) Int. Cl.
*F01D 7/00* (2006.01)
*F01D 21/00* (2006.01)

(52) U.S. Cl.
CPC ............. *F01D 7/00* (2013.01); *F01D 21/003* (2013.01); *F05D 2220/36* (2013.01); *F05D 2260/70* (2013.01)

(58) Field of Classification Search
CPC ........ F01D 21/003; F01D 17/02; F01D 25/24; F05D 2220/36; F05D 2270/334; G01H 1/006
See application file for complete search history.

(56) References Cited

U.S. PATENT DOCUMENTS 4,060,329 A 11/1977 Ellis
4,951,500 A 8/1990 Twerdochlib et al.
4,967,550 A * 11/1990 Acton ................ G05D 16/2066 415/119
5,005,353 A * 4/1991 Acton ..................... F01D 25/06 415/119
5,206,816 A * 4/1993 Hill ........................ G01H 1/006 702/56
5,259,187 A 11/1993 Dunbar et al.
5,511,426 A 4/1996 Clement et al.
(Continued)

FOREIGN PATENT DOCUMENTS

FR 3127269 A1 3/2023
FR 3130896 A1 6/2023
(Continued)

OTHER PUBLICATIONS

Mandache, Catalin, et al. "Aircraft Engine Blade Tip Monitoring Using Pulsed Eddy Current Technology," 4th International Symposium on NDT in Aerospace 2012 (Year: 2012).*
(Continued)

*Primary Examiner* — David P. Olynick
(74) *Attorney, Agent, or Firm* — Venable LLP; Duarte Y Ho; Michele V. Frank

(57) ABSTRACT

A turbine engine includes a fan having a plurality of fan blades, a nacelle that surrounds the fan, and a fan blade sensor system. The fan blade sensor system includes a plurality of fan blade sensors disposed in the nacelle to sense the plurality of fan blades as the plurality of fan blades rotates. The fan blade sensor system also includes a controller that determines a fan speed of the fan based on a rotational time between the fan blades as sensed by the plurality of fan blade sensors.

20 Claims, 8 Drawing Sheets

(56) References Cited

U.S. PATENT DOCUMENTS

| | | | | |
|---|---|---|---|---|
| 6,195,982 | B1 * | 3/2001 | Gysling | F04D 29/668 415/119 |
| 7,707,889 | B2 | 5/2010 | Maurus et al. | |
| 8,256,297 | B2 | 9/2012 | Sue et al. | |
| 9,512,736 | B2 * | 12/2016 | Gendrich | F01D 17/02 |
| 9,528,387 | B2 | 12/2016 | Jousselin | |
| 10,436,056 | B2 | 10/2019 | Prentice | |
| 10,508,948 | B2 | 12/2019 | Talon et al. | |
| 10,711,703 | B2 | 7/2020 | Rosenkrans et al. | |
| 10,794,387 | B2 * | 10/2020 | Consiglio | F04D 27/001 |
| 11,174,750 | B2 * | 11/2021 | Gysling | G01H 1/003 |
| 11,396,847 | B2 | 7/2022 | Rosenkrans et al. | |
| 2007/0250245 | A1 * | 10/2007 | van der Merwe | G01H 1/006 701/100 |
| 2008/0127734 | A1 * | 6/2008 | van der Merwe | G01H 1/003 73/660 |
| 2009/0177363 | A1 * | 7/2009 | Kulczyk | G01P 3/488 73/112.05 |
| 2010/0003121 | A1 * | 1/2010 | Berryann | F02K 1/16 415/13 |
| 2016/0281528 | A1 * | 9/2016 | Penda | F01D 5/12 |
| 2016/0319837 | A1 * | 11/2016 | Morris | F04D 29/362 |
| 2017/0134154 | A1 * | 5/2017 | Pratt | F01D 21/003 |
| 2018/0038285 | A1 * | 2/2018 | Rosenkrans | F01D 17/08 |
| 2018/0066535 | A1 * | 3/2018 | Gysling | F01D 21/003 |
| 2018/0066668 | A1 * | 3/2018 | Consiglio | F01D 17/04 |
| 2020/0088108 | A1 * | 3/2020 | Klein | F02K 3/06 |
| 2023/0279872 | A1 * | 9/2023 | Miller | F04D 29/5846 415/208.1 |

FOREIGN PATENT DOCUMENTS

| | | | |
|---|---|---|---|
| FR | 3130897 | A1 | 6/2023 |
| FR | 3133367 | A1 | 9/2023 |
| FR | 3133368 | A1 | 9/2023 |

OTHER PUBLICATIONS

Ryszard Szczepanik, Radosław Przysowa, Jarosław Spychała, Edward Rokicki, Krzysztof Kaźmierczak and Paweł Majewski (2012). Application of Blade-Tip Sensors to Blade-Vibration Monitoring in Gas Turbines, Thermal Power Plants, Dr. Mohammad Rasul (Ed.), ISBN: 978-953-307-952-3. (Year: 2012).*

Radosław Przysowa, et al. "Inductive Sensors for Blade Tip-Timing in Gas Turbines, "Journal of KONBiN 4(36)2015, DOI 10.1515/jok-2015-0064. (Year: 2015).*

Bing Yu, et al. "A review of blade tip clearance-measuring technologies for gas turbine engines," Measurement and Control 2020, vol. 53(3-4) 339-357 (Year: 2020).*

C. S. Mistry et al. (eds.), Proceedings of the National Aerospace Propulsion Conference, Lecture Notes in Mechanical Engineering, https://doi.org/10.1007/978-981-15-5039-3_15, Priya et al, "Rotor Blade Vibration Measurement on Aero Gas Turbine Engines," 263 -273, ©Springer Nature Singapore Pte Ltd. (Year: 2021).*

* cited by examiner

TURBINE ENGINE INCLUDING A FAN BLADE SENSOR SYSTEM

TECHNICAL FIELD

The present disclosure relates generally to fan blade sensor systems for turbine engines.

BACKGROUND

Turbine engines, for example, for an aircraft, generally include a fan and a turbo-engine arranged in flow communication with one another. Some turbine engines include speed sensors for sensing a rotational speed of one or more rotating components of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1A:
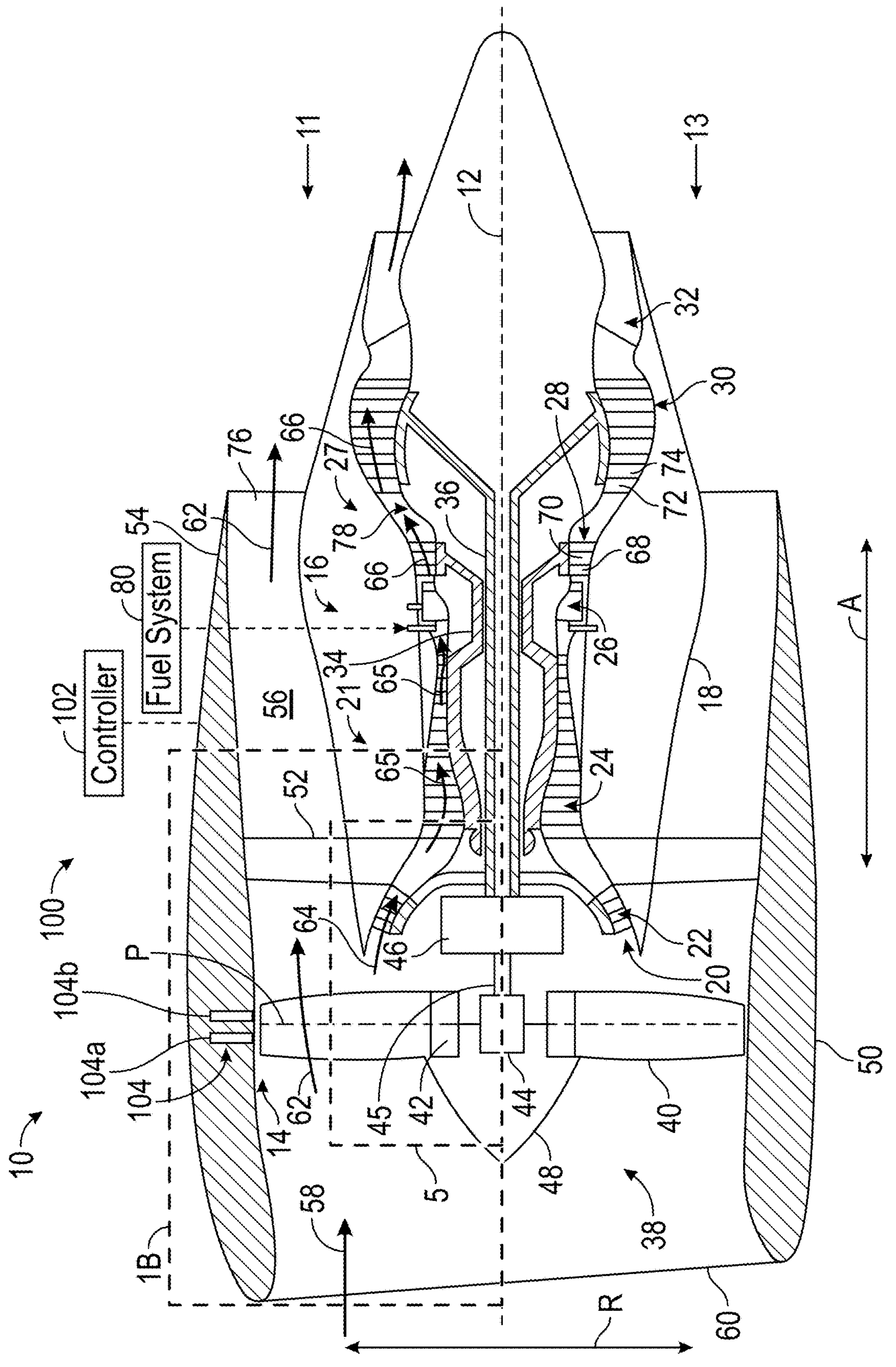
FIG. 1A is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "slew rate" is a rate of change of a pitch of the fan blades.

As used herein, an "integral drive engine" or an "integral drive configuration" is a turbine engine having a gearbox assembly that transfers power from a turbine shaft to a fan shaft.

As used herein, "flutter" is a self-excited vibration of a fan blade due to the interaction of structural-dynamic and aerodynamic forces.

As used herein, "asynchronous flutter" is a flutter that occurs at a frequency that is unrelated to the rotational speed of the fan or the blade passing frequency. The blade passing frequency is equal to the rotational speed of the fan (in rotations per minute) multiplied by the number of fan blades on the fan (and divided by sixty seconds).

As used herein, "synchronous flutter" is a flutter that occurs at a frequency that is equivalent to the rotational speed of the fan or the blade passing frequency, or a harmonic (positive multiple integer) thereof.

The present disclosure provides for a turbine engine that includes a fan casing (e.g., a nacelle) that surrounds the fan. The turbine engine includes a fan blade sensor system and a gearbox assembly, also referred to as a power gearbox, that transfers power from a turbine shaft of the turbine engine to a fan (e.g., a fan shaft or a propeller shaft). Such turbine engines are referred to as integral drive engines. Integral drive engines differ from direct drive engines that directly couple the fan shaft to the turbine shaft without the use of a gearbox. The fan of direct drive engines rotates at a same speed as the turbine shaft. The fan of integral drive engines, however, rotates at a lower speed than the turbine shaft due to the reduction of speed through the power gearbox. The fan blade sensor system has one or more fan blade sensors that sense a fan speed of the fan.

Some turbine engines include a lubricant sump, also referred to as an oil wetted bearing sump, that collects and supplies lubricant (e.g., oil) to one or more bearings of the turbine engine. The available space, the desirable space, or the volume available in that part of the turbine engine for the lubricant sump is less for integral drive engines compared to direct drive engines. This is due to the gearbox assembly in that part of the turbine engine that reduces the amount of space available compared to direct drive engines. The available space in that part of the turbine engine cannot be simply scaled up without affecting other components of the turbine engine. For example, increasing the size of the lubricant sump affects the overall length of the turbine engine, the fan radius ratio of the fan, the fan diameter of the fan, or a combination thereof.

The fan blade sensors are typically positioned through the lubricant sump in direct drive engines due to having more space in that part of the turbine engine for fitting the fan blade sensors as compared to integral drive engines. Such positioning of the fan blade sensors allow the sensors to have a direct line of site to the fan shaft for sensing the rotational speed of the fan. The fan blade sensors, however, are unable to be positioned through the lubricant sump in integral drive engines without increasing at least one of the overall length of the turbine engine, the fan radius ratio, or the fan diameter, which affects dynamics and performance of the fan and the turbine engine. The available space in that part of the turbine engine cannot be simply scaled up without affecting other components of the turbine engine. For example, increasing the size of the lubricant sump affects the overall length of the turbine engine, the fan radius ratio of the fan, the fan diameter of the fan, or a combination thereof. The fan blade sensors are typically positioned through the lubricant sump in direct drive engines due to having more space in that part of the turbine engine for fitting the fan blade sensors as compared to integral drive engines. The fan blade sensors, however, are unable to be positioned through the lubricant sump in integral drive engines without increasing the amount of space available in that part of the engine (e.g., as given by at least one of the overall length of the turbine engine, the fan radius ratio, or the fan diameter), and affecting dynamics and performance of the fan and the turbine engine.

In particular, increasing the size of the lubricant sump requires the fan hub radius to be increased in order to increase the radial space under the fan available for the lubricant sump, and increases the fan radius ratio (i.e., the ratio of the fan hub radius to the fan blade radius). However, increasing the fan hub radius sacrifices aerodynamic performance as there is less surface area of the fan blades moving air therethrough (e.g., less surface area of the fan blades is disposed in the flow path of the incoming air). The fan diameter also affects the volume available for the fan blade sensors underneath the fan. Decreasing the fan diameter provides for more space underneath the fan by increasing the radial spacing between blades and within the volume circumscribed by the fan blades, but decreases the fan tip speed for a given rotational speed, and, thus, reduces the aerodynamic performance of the fan. Increasing the fan blade diameter increases the aerodynamic performance of the fan, but the radial spacing between blades and within the volume circumscribed by the fan blades (e.g., within the space beneath the fan) decreases, and, thus, decreasing the volume beneath the fan and providing less space for the fan blade sensors underneath the fan. Some turbine engines also include a fan actuation system that further reduces the amount of space available for the fan blade sensor system in that part of the engine.

Further, some current fan blade sensor systems utilize oil-wetted sensors that are disposed within the sump, but such sensors provide less accuracy as compared to sensors that are able to directly sense a component. Moreover, fan blade sensors that are used to sense a fan speed of the fan may be unable to be moved other parts of the engine (e.g., the nacelle) as such sensors typically require a direct line of sight to the fan. Typically, different types of sensors are needed to sense the fan speed, the blade pitch angle, or the flutter of the fan.

Accordingly, the present disclosure provides for a fan blade sensor system that includes a plurality of fan blade sensors positioned to sense the fan. The plurality of fan blade sensors is located in the fan case of the turbine engine, to measure fan speed of the fan, fan blade pitch angle of the fan blades, and flutter of the fan blades. In this way, the one or more fan blade sensors are positioned outside (e.g., radially outward) of the lubricant sump, and the lubricant sump does not need to be scaled up. Thus, the fan blade sensor system of the present disclosure can fit outside or within the tight space of the integral drive engine without affecting at least one of the overall length of the turbine engine, the fan radius ratio, or the fan diameter. The fan blade sensors can be at least one of variable reluctance sensors, pressure sensors, or vibration sensors such that the sensors can sense the fan without having a direct line of sight of the fan blade. The fan blade sensors herein include a single type of sensor used to measure the fan speed, the fan blade pitch angle, and the flutter.

Variable reluctance sensors generate an electrical voltage spike when passed by a metal (ferromagnetic) object. Variable reluctance sensors react to the metal in a fan blade or a fan blade tip as the fan blade passes the sensor. Pressure sensors are open to the inner surface of the fan duct, such that the pressure sensors sense a pressure wave that occurs as a fan blade passes. Vibration sensors (e.g., piezo electric sensors) sense vibrations of the fan case that occur due to the pressure wave that occurs as a fan blade passes. In this way, the fan blade sensors herein can sense a fan blade without having a direct line of sight of the fan blade.

A single first fan blade sensor can pick up a fan blade passing frequency, from which a controller calculates the fan speed of the fan. A second fan blade sensor placed in the same circumferential location as the first fan blade sensor, but in a different axial location (e.g., axially spaced from the first fan blade sensor) of the turbine engine can be used to calculate the fan blade pitch angle of the fan blade from the difference in time between the signals from the two sensors. The fan blade sensors sense a leading edge and a trailing edge of each of the fan blades. The leading edge and trailing edge pass the fan blade sensors at slightly different times. Sensing the leading edge and the trailing edge provides for increased accuracy of sensing the difference in time between the signals from the two sensors as the leading edge and the trailing edge have the greatest time difference in passing the first fan blade sensor and the second fan blade sensor as compared to sensing other locations of the fan blades.

Asynchronous flutter of the fan blades can be perceived by the difference in time between fan blades passing a respective fan blade sensor, while the fan is operating in a steady state. Asynchronous flutter may result in a noisy speed signal, but the noise can be minimized by calculating speed based on the passing time of a single fan blade on consecutive revolutions. A synchronous flutter, particularly, a once per revolution (1/rev) flutter of the fan blade is unable to be detected from a single circumferential location. Thus, the fan blade sensors are spaced circumferentially around the fan case such that the fan blade sensor system detects the synchronous flutter from the rotational time difference between the fan blade passing the fan blade sensors at different circumferential locations. In some embodiments, the fan blade sensor system determines an imbalance of the fan based on a vibration sensor on the fan bearing.

Figure 1B:
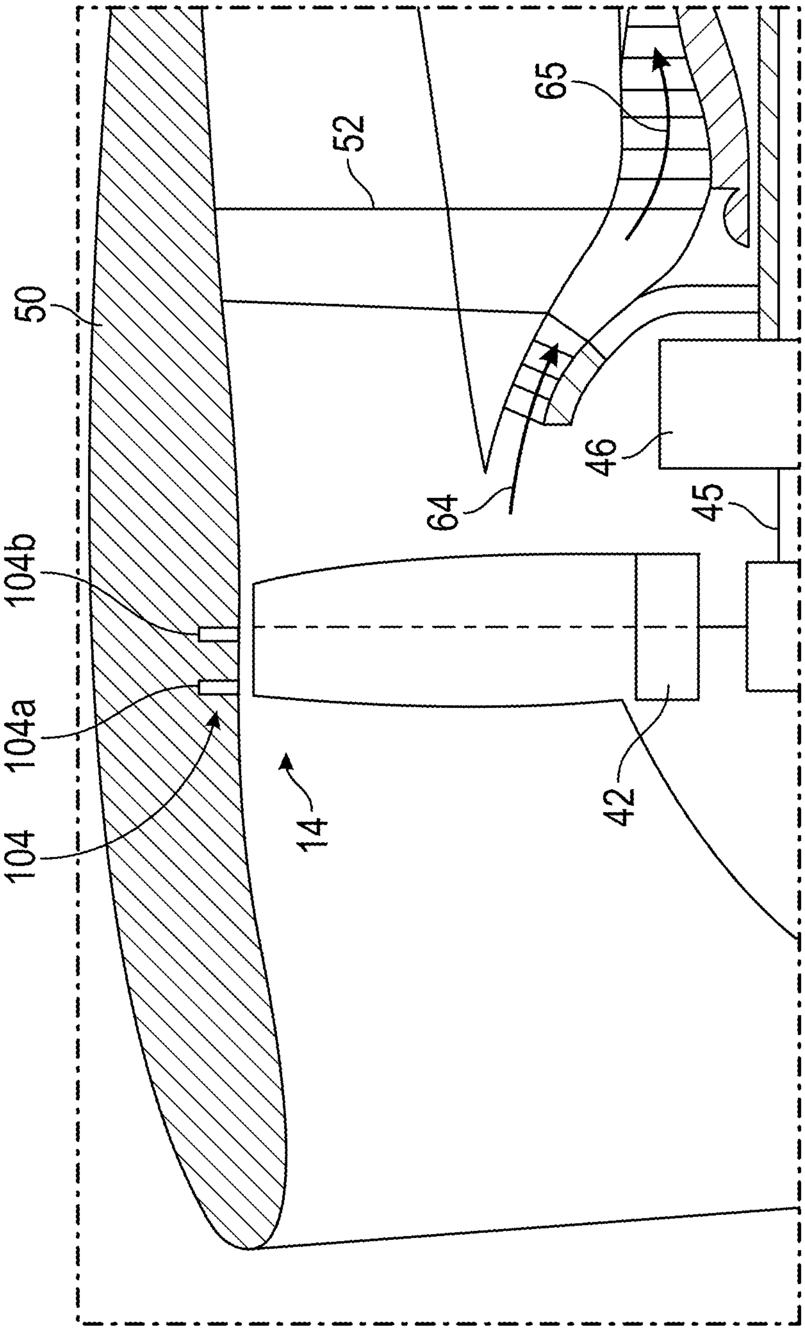
FIG. 1B is an enlarged schematic partial cross-sectional diagram of the turbine engine and the fan blade sensor system of FIG. 1A, taken at detail 1B in FIG. 1A, according to the present disclosure.
Figure 1C:
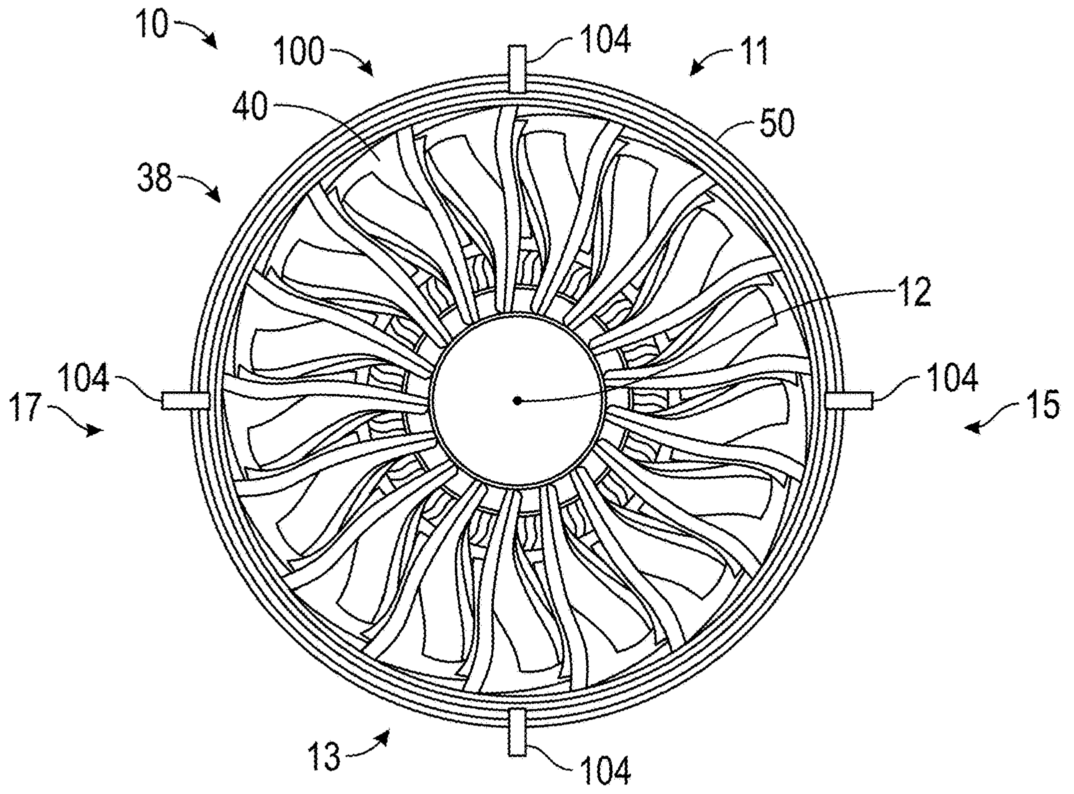
FIG. 1C is a schematic front view of the turbine engine of FIG. 1A, according to the present disclosure.
Figure 1D:
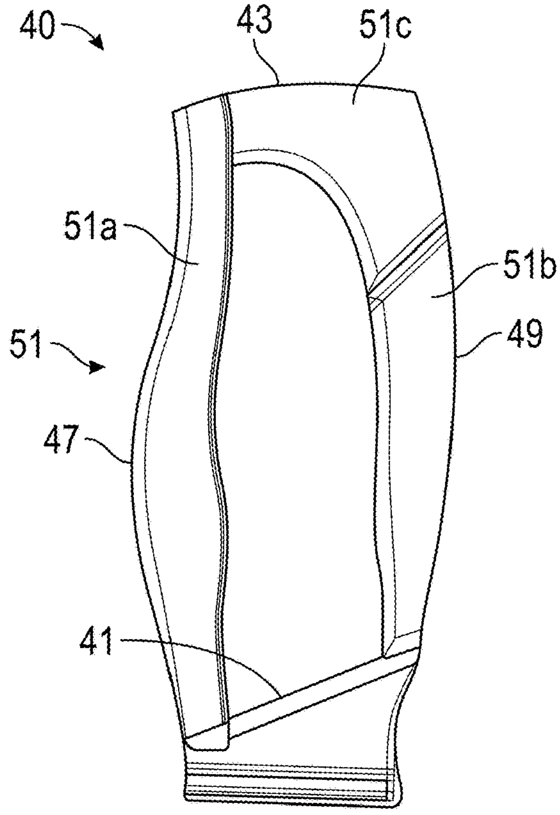
FIG. 1D shows a fan blade isolated from the turbine engine of FIG. 1A, according to the present disclosure.

Referring now to the drawings, FIG. 1A is a schematic cross-sectional diagram of a turbine engine 10 including a fan blade sensor system 100, taken along a longitudinal centerline axis 12 of the turbine engine 10, according to the present disclosure. FIG. 1B is an enlarged schematic partial cross-sectional diagram of the turbine engine 10 and the fan blade sensor system 100, taken at detail 1B in FIG. 1A, according to the present disclosure. FIG. 1C is a schematic front view of the turbine engine 10, according to the present disclosure. FIG. 1D shows a fan blade 40 isolated from the turbine engine 10 of FIG. 1A, according to the present disclosure.

As shown in FIG. 1A, the turbine engine 10 defines an axial direction A (extending parallel to the longitudinal centerline axis 12 provided for reference) and a radial direction R that is normal to the axial direction A. In general, the turbine engine 10 includes a fan assembly 14 and a turbo-engine 16 disposed downstream from the fan assembly 14. In the orientation of FIG. 1A, portions of the turbine engine 10 above the longitudinal centerline axis 12 are referred to as a top portion 11 and portions of the turbine engine 10 below the longitudinal centerline axis 12 are referred to as a bottom portion 13.

The turbo-engine 16 includes, in serial flow relationship, a compressor section 21, a combustor 26, and a turbine section 27. The turbo-engine 16 depicted is substantially enclosed within a core cowl 18 (e.g., an outer casing) that is substantially tubular and defines a core inlet 20 having an annular shape that is annular about the longitudinal centerline axis 12. As schematically shown in FIG. 1A, the compressor section 21 includes a booster or a low-pressure (LP) compressor 22 followed downstream by a high-pressure (HP) compressor 24. The combustor 26 is downstream of the compressor section 21. The turbine section 27 is downstream of the combustor 26 and includes a high-pressure (HP) turbine 28 followed downstream by a low-pressure (LP) turbine 30, also referred to as a power turbine. The turbo-engine 16 also includes a core exhaust nozzle 32 that is downstream of the turbine section 27. The turbo-engine 16 further includes a high-pressure (HP) shaft 34, also referred to as a high-speed shaft, that drivingly connects the HP turbine 28 to the HP compressor 24. The HP turbine 28 and the HP compressor 24 rotate in unison through the HP shaft 34. The turbo-engine 16 includes a low-pressure (LP) shaft 36, also referred to as a low-speed shaft, that drivingly connects the LP turbine 30 to the LP compressor 22. The LP turbine 30 and the LP compressor 22 rotate in unison through the LP shaft 36. The compressor section 21, the combustor 26, the turbine section 27, and the core exhaust nozzle 32 together define a core air flow path.

For the embodiment depicted in FIGS. 1A to 1D, the fan assembly 14 includes a fan 38 (e.g., a variable pitch fan) having a plurality of fan blades 40 coupled to a fan disk 42 in a spaced apart manner. As shown in FIG. 1D, each of the plurality of fan blades 40 extends radially from a root 41 at the fan disk 42 (FIG. 1A) to a tip 43, and includes a leading edge 47 and a trailing edge 49. Each of the plurality of fan blades 40 includes one or more metal fan blade components 51. The one or more metal fan blade components 51 can include any type of metal used for manufacturing fan blades, such as, for example, stainless steel, titanium, aluminum alloys, or the like. The one or more metal fan blade components 51 include a metal leading edge component 51*a* that extends radially along the leading edge 47, a metal trailing edge component 51*b* that extends radially along the trailing edge 49, and a metal tip component 51*c* that extends axially along the tip 43. In FIG. 1D, the metal leading edge component 51*a* extends an entire radial height of a respective fan blade 40 such that the metal leading edge component 51*a* defines an entirety the leading edge 47. The metal leading edge component 51*a* also defines a portion of the tip 43 at the leading edge 47. The metal trailing edge component 51*b* extends a partial radial height of the trailing edge 49 such that the metal trailing edge component 51*b* defines a partial radial height of the trailing edge 49. The metal tip component 51*c* defines the tip 43 aft of the leading edge 47 and extends partially radially inward at the trailing edge 49 such that the metal tip component 51*c* defines a portion of the trailing edge 49. The fan blades 40 can have different configurations of the one or more metal fan blade components 51. In some embodiments, a body of the fan blades 40 is made of a non-metal material (e.g., a ceramic material, a composite material, a polymer matrix composite material, or the like), and the one or more metal fan components 51 are coupled to the body during manufacturing. In some embodiments, an entirety of each of the fan blades 40 is made of metal.

Referring to FIG. 1A, the fan blades 40 extend outwardly from the fan disk 42 generally along the radial direction R. Each fan blade 40 is rotatable relative to the fan disk 42 about a pitch axis P by virtue of the fan blades 40 being operatively coupled to a fan actuation system 44 configured to collectively vary the pitch of the fan blades 40 in unison, as detailed further below. The fan actuation system 44 is disposed within a fan hub 48. The fan blades 40, the fan disk 42, and the fan actuation system 44 are together rotatable about the longitudinal centerline axis 12 via a fan shaft 45 that is powered by the LP shaft 36 across a power gearbox, also referred to as a gearbox assembly 46 (i.e., an integral drive configuration).

The gearbox assembly 46 is shown schematically in FIG. 1A. The gearbox assembly 46 includes a plurality of gears for adjusting the rotational speed of the fan shaft 45 and, thus, the fan 38 relative to the LP shaft 36. The gearbox assembly 46 has a gear ratio in a range of 3.5:1 to 5:1 for a ducted engine (e.g., the turbine engine 10). The LP shaft 36, the gearbox assembly 46, and the fan shaft 45 are disposed in an in-line configuration such that the LP shaft 36, the gearbox assembly 46, and the fan shaft 45 are coaxial and are each disposed about the longitudinal centerline axis 12. The in-line configuration helps to reduce the space needed within the turbine engine 10 for the gearbox assembly 46 and allows a greater amount of torque to be transferred from the LP shaft 36 to the fan shaft 45 through the gearbox assembly 46 as compared to turboprop engines, in which the gearbox assembly is typically disposed in a stepped configuration and is not coaxial with the LP shaft and the fan shaft.

The fan disk 42 is covered by a fan hub 48 that rotates and is aerodynamically contoured to promote an airflow through the plurality of fan blades 40. In addition, the fan assembly 14 includes an annular fan casing or a nacelle 50 that circumferentially surrounds the fan 38 and at least a portion of the turbo-engine 16. In this way, the turbine engine 10 is a ducted engine. The nacelle 50 is supported relative to the turbo-engine 16 by a fan frame that includes a plurality of fan guide vanes 52, also referred to as outlet guide vanes, that is spaced circumferentially about the nacelle 50. Moreover, a downstream section 54 of the nacelle 50 extends over an outer portion of the turbo-engine 16 to define a bypass airflow passage 56 therebetween.

During operation of the turbine engine 10, a volume of air 58 enters the turbine engine 10 through an inlet 60 of the nacelle 50 or the fan assembly 14. As the volume of air 58 passes across the fan blades 40, a first portion of air, referred to as bypass air 62, is directed or routed into the bypass airflow passage 56, and a second portion of air, referred to as core air 64, is directed or is routed into the upstream section of the core air flow path, or, more specifically, into the core inlet 20 of the LP compressor 22. The ratio between the bypass air 62 and the core air 64 is commonly known as a bypass ratio. The pressure of the core air 64 is then increased by the LP compressor 22 to produce compressed air 65, and the compressed air 65 is routed through the HP compressor 24 and into the combustor 26, where the compressed air 65 is mixed with fuel and burned to generate combustion gases 66.

The combustion gases 66 are routed into the HP turbine 28 and expanded through the HP turbine 28 where a portion of thermal energy and kinetic energy from the combustion gases 66 is extracted via one or more stages of HP turbine stator vanes 68 that are coupled to the core cowl 18 and HP turbine rotor blades 70 that are coupled to the HP shaft 34. This causes the HP shaft 34 to rotate, which supports operation of the HP compressor 24 (e.g., a self-sustaining cycle). In this way, the combustion gases 66 do work in the HP turbine 28 to cause the HP turbine rotor blades 70 (and the HP shaft 34) to rotate at a sufficient rate to maintain the compression ratio of the HP compressor 24 (e.g., a self-sustaining cycle). The combustion gases 66 are then routed into the LP turbine 30 and expanded through the LP turbine 30. Here, a second portion of the thermal energy and the kinetic energy is extracted from the combustion gases 66 via one or more stages of LP turbine stator vanes 72 that are coupled to the core cowl 18 and LP turbine blades 74 that are coupled to the LP shaft 36. This causes the LP shaft 36 to rotate, which supports operation of the LP compressor 22 and rotation of the fan 38 via the gearbox assembly 46 (e.g., a self-sustaining cycle). In this way, the combustion gases 66 do work in the LP turbine 30 to cause the LP turbine blades 74 (and the LP shaft 36) to rotate.

The combustion gases 66 are subsequently routed through the core exhaust nozzle 32 of the turbo-engine 16 to provide propulsive thrust. Simultaneously, the bypass air 62 is directed through the bypass airflow passage 56 before being exhausted from a fan exhaust nozzle 76 of the turbine engine 10, also providing propulsive thrust. The HP turbine 28, the LP turbine 30, and the core exhaust nozzle 32 at least partially define a hot gas path 78 for routing the combustion gases 66 through the turbo-engine 16.

The turbine engine 10 includes a fuel system 80 for providing the fuel to the combustor 26. For example, the fuel system 80 can include a fuel tank for storing the fuel, one or more fuel lines in flow communication with the fuel tank and the combustor 26, and a fuel pump for delivering the fuel from the fuel tank to the combustor 26 through the one or more fuel lines.

Referring to FIGS. 1A and 1B, the fan blade sensor system 100 includes a controller 102 (FIG. 1A) and a plurality of fan blade sensors 104 (shown schematically in FIGS. 1A and 1B). The controller 102 is in communication with the turbine engine 10 for controlling aspects of the turbine engine 10. For example, the controller 102 is in two-way communication with the turbine engine 10 for receiving signals from various sensors (e.g., the fan blade sensors detailed herein) and control systems of the turbine engine 10 (e.g., the fuel system 80), and for controlling components of the turbine engine 10 (e.g., the fuel system 80, the fan blades 40, etc.), as detailed further below. The controller 102, or components thereof, may be located onboard the turbine engine 10, onboard the aircraft, or can be located remote from each of the turbine engine 10 and the aircraft. The controller 102 can be a Full Authority Digital Engine Control (FADEC) that controls aspects of the turbine engine 10.

The controller 102 may be a standalone controller or may be part of an engine controller to operate various systems of the turbine engine 10. In this embodiment, the controller 102 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 102 to perform operations. The controller 102 and, more specifically, the one or more processors are programmed or configured to perform these operations, such as the operations discussed further below. In some embodiments, the instructions can be executed by the one or more processors to cause the one or more processors to complete any of the operations and functions for which the controller 102 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIGS. 1A to 1D is by way of example only. In other exemplary embodiments, the turbine engine 10 may have other suitable configurations. In other exemplary embodiments, any other suitable number or configuration of compressors, turbines, shafts, or a combination thereof may be provided. The turbine engine 10 may also be a direct drive engine, which does not have a power gearbox (e.g., the gearbox assembly 46). The fan speed is the same as the LP shaft speed for a direct drive engine. In still other exemplary embodiments, aspects of the present disclosure may be incorporated into other suitable turbine engines.

The plurality of fan blade sensors 104 senses a rotational speed, also referred to as a fan speed, of the fan 38, and sends the fan speed (i.e., a fan speed signal) to the controller 102. For example, the plurality of fan blade sensors 104 includes variable reluctance sensors. In this way, the plurality of fan blade sensors 104 measures changes in magnetic reluctance, and, particularly, detects a change in proximity of ferrous (e.g., metal) objects, such as the fan blades 40, as detailed further below. In particular, the plurality of fan blade sensors 104 generates an electrical voltage spike when the fan blades 40 (e.g., the one or more metal fan blade components 51) pass by the plurality of fan blade sensors 104. The plurality of fan blade sensors 104 can include any type of fan blade sensor for sensing a change in proximity of the fan blades 40 based on magnetic reluctance of the fan blades 40.

The plurality of fan blade sensors 104 is positioned to sense the fan blades 40. In particular, the plurality of fan blade sensors 104 is mounted in the nacelle 50 such that the plurality of fan blade sensors 104 is radially outward of the fan blades 40 and axially aligned with the fan blades 40. The plurality of fan blade sensors 104 includes two fan blade sensors 104 in circumferential proximity and spaced axially apart to detect forward portions and aft portions of a fan blade 40 passing by the two fan blade sensors 104. In particular, the plurality of fan blade sensors 104 includes a first fan blade sensor **104*a* and a second fan blade sensor 104*b* spaced axially from the first fan blade sensor 104*a*. The first fan blade sensor 104*a* and the second fan blade sensor 104*b* are positioned at a same circumferential location on the nacelle. The second fan blade sensor 104*b* is positioned axially aft of the first fan blade sensor 104*a*. In this way, the first fan blade sensor 104*a* senses a first axial position of each of the fan blades 40 and the second fan blade sensor 104*b* senses a second axial position of each of the fan blades 40. The first fan blade sensor 104*a* is positioned to sense the leading edge 47 (e.g., the metal leading edge component 51*a*) of each of the fan blades 40. The second fan blade sensor 104*b* is positioned to sense the trailing edge 49 (e.g., the metal trailing edge component 51*b*) of each of the fan blades 40. The first fan blade sensor 104*a* and the second fan blade sensor 104*b* can be located at any axial position along the fan blades 40 to sense each of the fan blades 40 passing the first fan blade sensor 104*a* and the second fan blade sensor 104*b***.

With reference to FIG. 1C, the turbine engine 10 includes a first horizontal side 15 and a second horizontal side 17 opposite the first horizontal side 15. The turbine engine 10 may be viewed with respect to a "clock" orientation having a twelve o'clock position, a three o'clock position, a six o'clock position, and a nine o'clock position, when viewed from the forward view of the turbine engine 10 (e.g., the view of FIG. 1C). Although not provided with reference numerals, the clock orientation is understood to include all clock positions therebetween. The twelve o'clock position is positioned at a top of the turbine engine 10 (e.g., at the top portion 11), the three o'clock position is positioned ninety degrees (90°) from the twelve o'clock position (e.g., at the first horizontal side 15), the six o'clock position is positioned at a bottom of the turbine engine 10 (e.g., at the bottom portion 13) and is one hundred eighty degrees (180°) from the twelve o'clock position, and the nine o'clock position is positioned ninety degrees (90°) from the six o'clock position (e.g., at the second horizontal side 17).

As shown in FIG. 1C, the plurality of fan blade sensors 104 is spaced circumferentially about the fan 38 in the nacelle 50. Each circumferential location of the fan blade sensors 104 includes two fan blade sensors 104 (e.g., the first fan blade sensor **104*a* and the second fan blade sensor 104*b*). In particular, two fan blade sensors 104 are positioned on the top portion 11, two fan blade sensors 104 are positioned on the bottom portion 13, two fan blade sensors 104 are positioned on the first horizontal side 15, and two fan blade sensors 104 are positioned on the second horizontal side 17. For example, the two fan blade sensors 104 on the top portion 11 are positioned at the twelve o'clock position. The two fan blade sensors 104 on the bottom portion 13 are positioned at the six o'clock position. The two fan blade sensors 104 on the first horizontal side 15 are positioned at the three o'clock position. The two fan blade sensors 104 on the second horizontal side 17 are positioned at the nine o'clock position. The plurality of fan blade sensors 104 can include two fan blade sensors 104 positioned at any circumferential position in the nacelle 50 about the fan 38 to sense the plurality of fan blades 40 as the fan blades 40 pass the plurality of fan blade sensors 104**.

Figure 2:
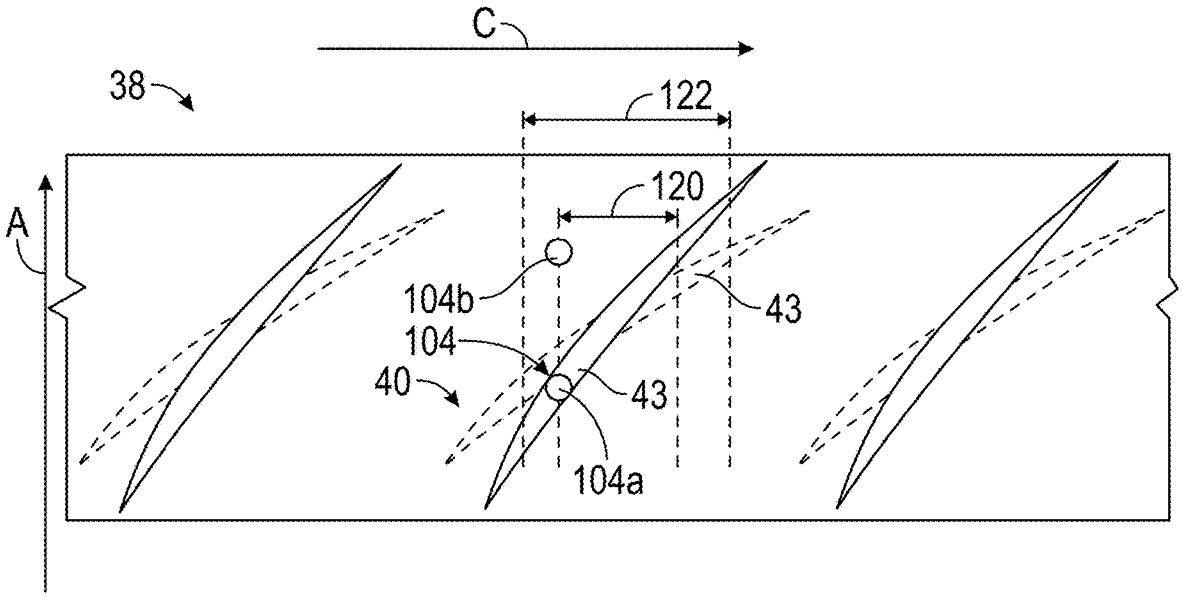
FIG. 2 is a top plan view of a portion of a fan of the turbine engine of FIG. 1A, according to the present disclosure, according to the present disclosure.

FIG. 2 is a top plan view of a portion of the fan 38, according to the present disclosure. As shown in FIG. 2, the first fan blade sensor **104*a* and the second fan blade sensor 104*b* are at the same circumferential position. The second fan blade sensor 104*b* is positioned axially aft of the first fan blade sensor 104*a*. The fan blades 40 are pitched at a first fan blade pitch angle (the fan blades 40 shown in solid lines in FIG. 2) such that the fan blade sensors 104 sense the tip 43 of each of the fan blades 40. The axial spacing of the first fan blade sensor 104*a* and the second fan blade sensor 104*b* allow the fan blade sensor system 100 to determine the fan blade pitch angle of the fan blades 40. In particular, the fan blade sensor system 100 determines a time difference between a respective fan blade 40 passing by the first fan blade sensor 104*a* and the second fan blade sensor 104*b*. The time difference includes a first time difference 120 between the first fan blade sensor 104*a* sensing the fan blades 40 and the second fan blade sensor 104*b* sensing the fan blades 40 at the first blade pitch angle. For example, the fan blade sensor system 100 (e.g., the controller 102) determines the first time difference 120 between the first fan blade sensor 104*a* sensing the tip 43 of the respective fan blade 40 and the second fan blade sensor 104*b* sensing the tip 43 of the respective fan blade 40 when the fan blade 40 is at the first blade pitch angle. The fan blade sensor system 100 then determines the first fan blade pitch angle of the respective fan blade 40 based on the first time difference 120 and the fan speed of the fan 38**, as detailed further below.

FIG. 2 also shows the fan blades 40 changing the fan blade pitch angle to a second fan blade pitch angle (the fan blades 40 shown in dashed lines in FIG. 2). The fan blade sensor system 100 also determines the change in the fan blade pitch of the fan blades 40 to the second fan blade pitch angle based on a second time difference 122. In particular, the fan blade sensor system 100 determines the second time difference 122 between the first fan blade sensor **104*a* sensing the tip 43 of the respective fan blade 40 and the second fan blade sensor 104*b* sensing the tip 43 of the respective fan blade 40 at the second blade pitch angle. The fan blade sensor system 100 then determines the second fan blade pitch angle of the respective fan blade 40 based on the second time difference 122 and the fan speed of the fan 38, as detailed further below. The second time difference 122 is greater than the first time difference 120** as the second blade pitch angle is greater than the first blade pitch angle.

Figure 3:
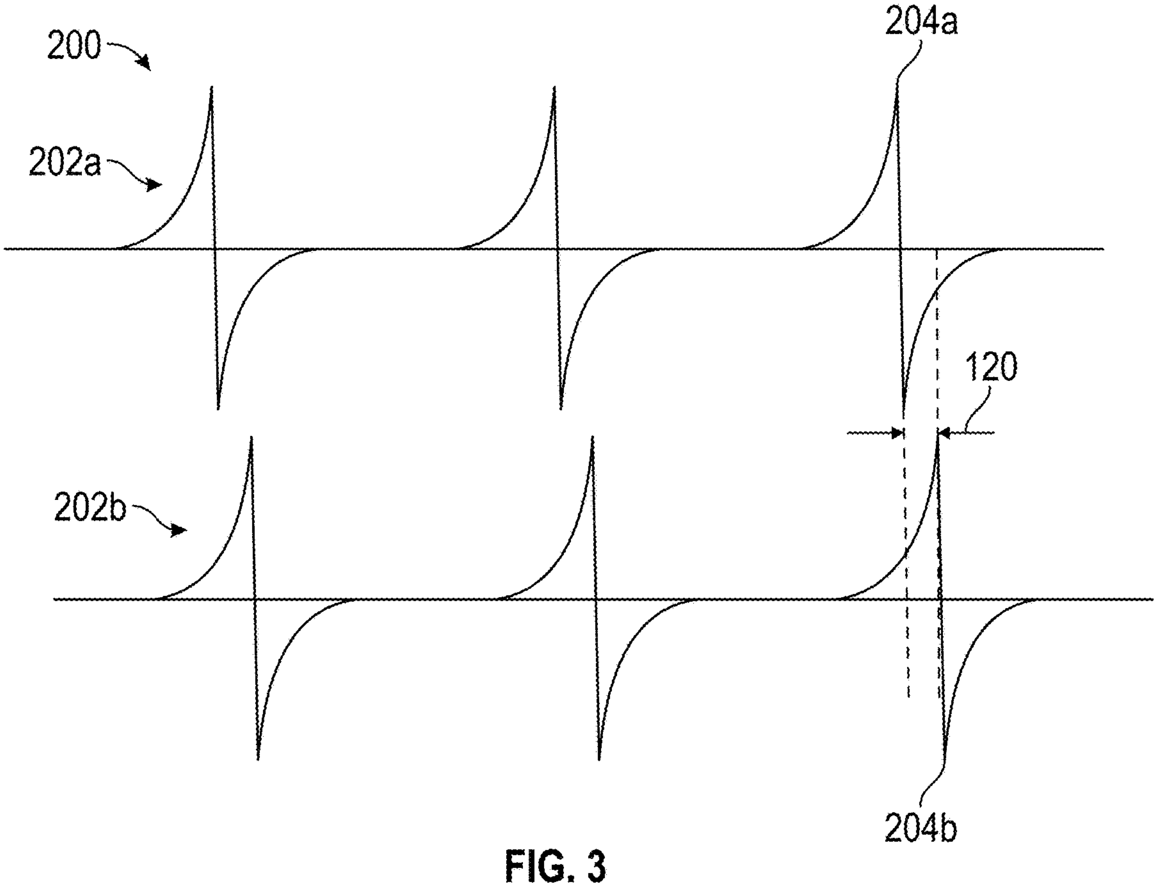
FIG. 3 illustrates a graph of sensor signals output from a plurality of fan blade sensors of the fan blade sensor system of FIGS. 1A to 2 over time, according to the present disclosure.

FIG. 3 illustrates a graph 200 of sensor signals 202*a*, 202*b* output from the plurality of fan blade sensors 104 over time, according to the present disclosure. As shown in FIG. 3, the first fan blade sensor 104*a* (axially forward sensor) outputs a first sensor signal 202*a*, and the second fan blade sensor 104*b* (axially aft sensor) outputs a second sensor signal 202*b*. A spike in the sensor signals 202*a*, 202*b* indicates a fan blade 40 passing by the respective fan blade sensors 104. In particular, a first spike 204*a* indicates the respective fan blade 40 passing by the first fan blade sensor 104*a*, and a second spike 204*b* indicates the respective fan blade 40 passing by the second fan blade sensor 104*b*. Each first spike 204*a* and each second spike 204*b* indicates a different fan blade 40 passing the first fan blade sensor 104*a* and the second fan blade sensor 104*b*, respectively. The first spike 204*a* and the second spike 204*b* for a particular fan blade 40 are offset due to the second fan blade sensor 104*b* being axially spaced from the first fan blade sensor 104*a*. The offset corresponds to the first time difference 120. Although not shown, the offset can also correspond to the second time difference 122 when the fan blade pitch angle of the fan blades 40 has changed to the second fan blade pitch angle. The fan blade sensor system 100 determines the fan speed of the fan 38, the fan blade pitch angle of the fan blades 40, and an asynchronous flutter of the fan 38, as detailed further below.

Figure 4:
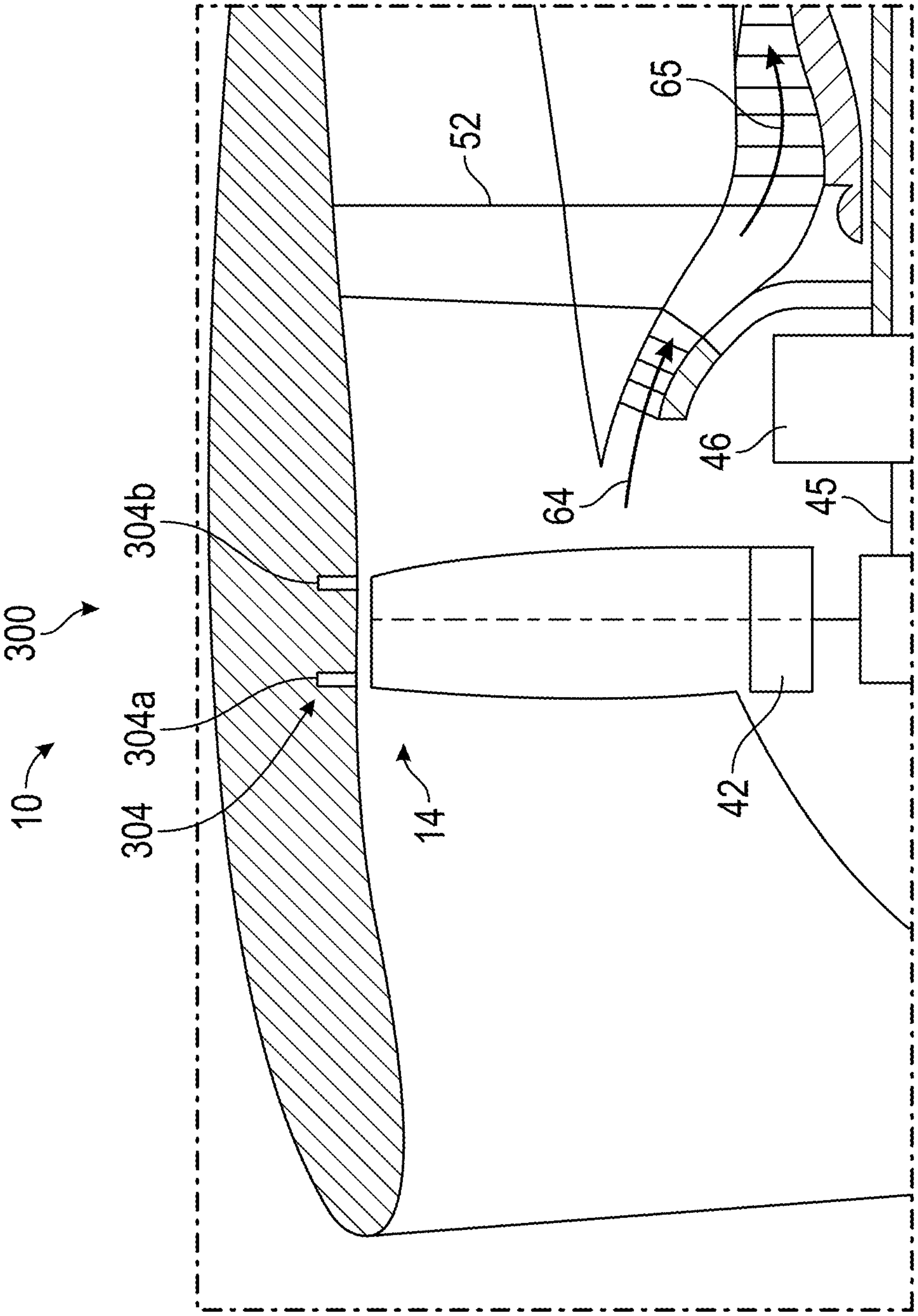
FIG. 4 is an enlarged partial cross-sectional diagram of the turbine engine of FIG. 1A with a fan blade sensor system, according to another embodiment.

FIG. 4 is an enlarged partial cross-sectional diagram of the turbine engine 10 with a fan blade sensor system 300, according to another embodiment. The fan blade sensor system 300 is substantially similar to the fan blade sensor system 100 of FIGS. 1A to 3. The fan blade sensor system 300 includes a plurality of fan blade sensors 304 including a first fan blade sensor 304*a* and a second fan blade sensor 304*b*. The plurality of fan blade sensors 304 includes pressure sensors. The plurality of fan blade sensors 304 measures a change in pressure as each of the plurality of fan blades 40 passes by the plurality of fan blade sensors 304. The plurality of fan blade sensors 304 generates an electrical voltage spike in response to the pressure change when the fan blades 40 pass by the plurality of fan blade sensors 304. The plurality of fan blade sensors 304 can include any type of pressure sensor for sensing a change in pressure of the fan 38 when the fan blades 40 pass by the plurality of fan blade sensors 304. In some embodiments, the plurality of fan blade sensors 304 includes vibration sensors (e.g., accelerometers) that measure a vibration of the fan 38 as the fan blades 40 pass by the plurality of fan blade sensors 304. In particular, the vibration sensors generate an electric voltage spike in response to the vibration as the fan blades 40 pass by the vibration sensors. The fan blade sensor system 300 determines the fan speed of the fan 38, the fan blade pitch angle of the fan blades 40, the asynchronous flutter of the fan 38, or the synchronous flutter of the fan 38, similar to the fan blade sensor system 100 of FIGS. 1A to 3.

Figure 5:
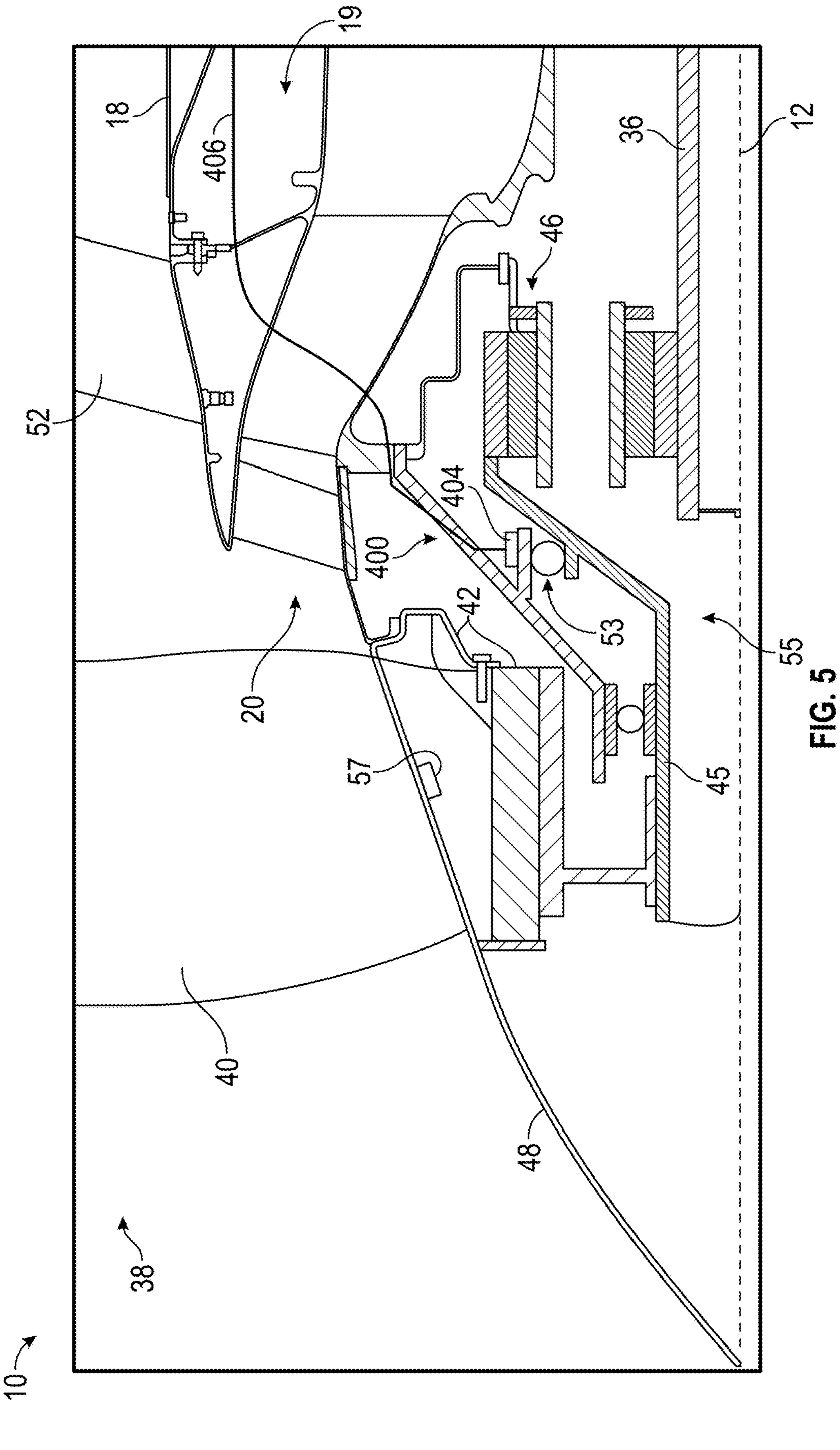
FIG. 5 is an enlarged partial schematic cross-sectional diagram of the turbine engine of FIG. 1A, taken at detail 5 in FIG. 1A, with a fan blade sensor system, according to the present disclosure.

FIG. 5 is an enlarged partial schematic cross-sectional diagram of the turbine engine 10, taken at detail 5 in FIG. 1A, with a fan blade sensor system 400, according to the present disclosure. As shown in FIG. 5, the core cowl 18 includes a hollow interior 19. The turbine engine 10 includes one or more fan bearings 53 that rotationally support the fan shaft 45. The turbine engine 10 includes a lubricant sump 55 that is positioned about the gearbox assembly 46 for collecting lubricant that is supplied to the one or more fan bearings 53 and to the gearbox assembly 46. The lubricant sump 55 is an oil wetted bearing sump. One or more of the fan blades 40 include a seeded imbalance 57. The seeded imbalance 57 is a mass that is coupled to one or more of the fan blades 40 to provide a greater mass on those fan blades 40 as compared to the fan blades 40 without the seeded imbalance 57.

The fan blade sensor system 400 includes one or more fan blade sensors 404. The one or more fan blade sensors 404 include vibration sensors (e.g., accelerometer) that measure vibrations and generate an electric voltage spike in response to the measured vibration. The one or more fan blade sensors 404 are positioned to sense the vibration of the one or more fan bearings 53. In particular, the one or more fan blade sensors 404 are coupled to the one or more fan bearings 53 for sensing the vibration of the fan bearings 53. The fan blades 40 with the seeded imbalance 57 generate a vibration as the fan blades 40 rotate, and the vibration propagates through the fan shaft 45 to the fan bearings 53. The fan blade sensors 404 detect the vibration of the fan bearings 53. The greater mass of the fan blades 40 with the seeded imbalance 57 results in a higher amplitude signal as compared to the fan blades 40 without the seeded imbalance 57, such that the fan blade sensor system 400 can determine when the fan blades 40 with the seeded imbalance 57 passes the fan blade sensors 404. Thus, the fan blade sensor system 400 can isolate faults based on the clock position of the fan shaft 45, and can also be used to synchronize two or more turbine engines (e.g., on an aircraft), so that a beat frequency (e.g., a difference in frequency between the two or more turbine engines) between the two or more turbine engines is minimized from a difference in speed between the two or more turbine engines.

Each of the one or more fan blade sensors 404 includes a cable 406 in communication with the controller 102 (FIG. 1A) for sending data to the controller 102. The cable 406 extends from the one or more fan blade sensors 404 through the fan frame (e.g., the fan guide vanes 52) and through the core cowl 18 (e.g., into the hollow interior 19). In some embodiments, the one or more fan blade sensors 404 can be wireless sensors such that the cable 406 is omitted and the data measured by the one or more fan blade sensors 404 is sent to the controller 102 wirelessly (e.g., via Wi-Fi, Bluetooth, cellular, or the like).

Figure 6:
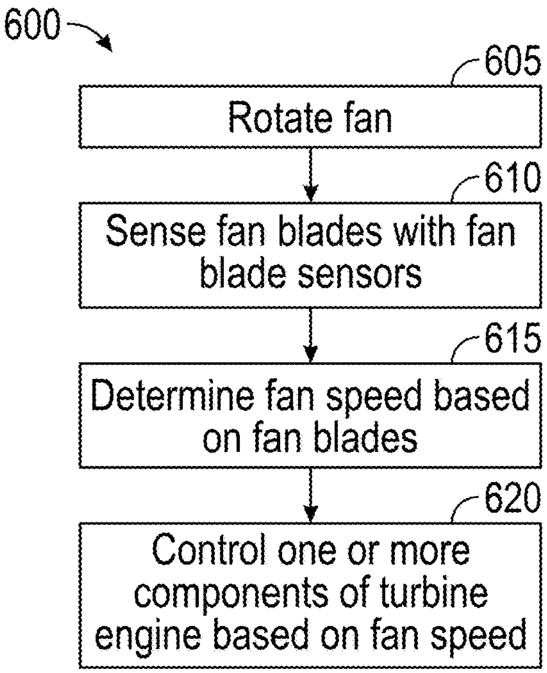
FIG. 6 is a flowchart of a method of operating the fan blade sensor system of FIGS. 1A to 2, according to the present disclosure.

FIG. 6 is a flowchart of a method 600 of operating the fan blade sensor system 100 of the turbine engine 10, according to the present disclosure. While reference is made to the fan blade sensor system of FIGS. 1A to 3, the method 600 can also be utilized for the fan blade sensor systems 300 and 400, respectively.

In step 605, the method 600 includes rotating the fan 38 (e.g., the fan blades 40). For example, as the turbine engine 10 operates, the fan 38 rotates, as detailed above with respect to FIG. 1A.

In step 610, the method 600 includes sensing the fan blades 40 with the fan blade sensors 104. The fan blade sensors 104 sense a time between the fan blades 40 passing the fan blade sensors 104 and a direction of rotation of the fan 38 based on the rotation of the fan blades 40. In particular, the fan blade sensors 104 sense at least one of the change in magnetic reluctance or the change in pressure as the fan blades 40 pass the fan blade sensors 104. The fan blade sensors 104 generate a signal indicative of the fan speed (e.g., the electric voltage spike) in response to the at least one of the change in magnetic reluctance or the change in pressure. The fan blade sensors 104 send the signal indicative of the fan speed to the controller 102.

In step 615, the method 600 includes determining the fan speed of the fan 38 based on the rotation of the fan blades 40. In particular, the controller 102 determines the fan speed based on the signal indicative of the fan speed (e.g., based on the at least one of the change in magnetic reluctance or the change in pressure). In some embodiments, the controller 102, a portion of the controller 102, or another controller, can be integrated within the fan blade sensors 104 such that the fan blade sensors 104 determine the fan speed based on the at least one of the change in magnetic reluctance or the change in pressure.

To determine the fan speed, the fan blade sensor system 100 (e.g., the controller 102) determines the time between a number N of the fan blades 40 passing by the fan blade sensors 104. The number N of the fan blades 40 is the number of fan blades 40 of the fan 38. The fan blade sensor system 100 then determines the fan speed of the fan 38 based on the time between the number N of the fan blades 40 passing by the fan blade sensors 104 (e.g., distance divided by time). The fan blade sensor system 100 determines the fan speed based on a single fan blade sensor 104.

In step 620, the method 600 includes controlling one or more components of the turbine engine 10 based on the fan speed of the fan 38. For example, the controller 102 controls the fuel system 80 (FIG. 1A) to control a fuel flow rate of the fuel to the combustor 26 (FIG. 1A). In particular, the controller 102 controls the fuel system 80 to reduce the fuel flow rate if the fan speed is above a fan speed threshold. In some embodiments, the controller 102 controls the slew rate of the plurality of fan blades 40 based on the fan speed of the fan 38 when the controller 102 adjusts the pitch of the plurality of fan blades 40. In particular, the controller 102 modifies the slew rate of the plurality of fan blades 40 in response to a rate of change of speed or in response to an absolute value of speed of the fan 38. Thus, the method 600 includes controlling at least one of the fuel flow rate of the fuel or the slew rate of the plurality of fan blades 40 based on the fan speed of the fan 38.

In some embodiments, the method 600 includes determining an asynchronous flutter of the fan blades 40 based on different fan blades 40 passing the fan blade sensors 104. For example, a difference in the time variation of the fan blades 40 passing the fan blade sensors 104 indicates the asynchronous flutter. In some embodiments, the method 600 includes detecting foreign object impact on the fan 38 if the asynchronous flutter is greater than a flutter threshold (e.g., the magnitude of the asynchronous flutter is greater than the flutter threshold). The method 600 include controlling the one or more components of the turbine engine 10 to reduce or to prevent the asynchronous flutter. For example, the fan blade sensor system 100 can change (e.g., increase or decrease) the fan blade pitch angle or can change (e.g., increase or decrease) the fan speed of the fan 38 to reduce or to prevent the asynchronous flutter. In some embodiments, a health monitor system for the turbine engine 10 identifies that maintenance is necessary based on the asynchronous flutter and generates an indication flag to indicate that the fan 38 requires maintenance. Asynchronous flutter may result in a noisy speed signal, but the noise can be minimized by calculating speed based on the passing time of a single fan blade 40 on consecutive revolutions.

In some embodiments, the method 600 includes determining a synchronous flutter of a fan blade 40 based on a rotational time difference of the fan blade 40 passing the different circumferential positions of the fan blade sensors 104. The synchronous flutter is a once per revolution flutter such that the magnitude of the flutter stays the same at a particular circumferential location, but varies at different circumferential locations about the fan 38. Thus, the fan blade sensor system 100 determines the synchronous flutter based on a rotational time difference between the fan blade 40 passing the fan blade sensor 104 at a first circumferential position and passing the fan blade sensor 104 at a second circumferential position.

Figure 7:
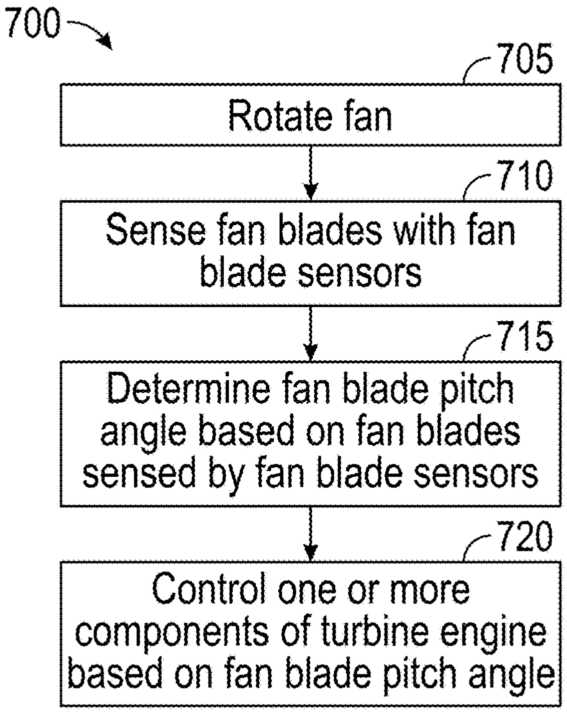
FIG. 7 is a flowchart of a method of operating the fan blade sensor system of FIGS. 1A to 2, according to the present disclosure.

FIG. 7 is a flowchart of a method 700 of operating the fan blade sensor system 100 of the turbine engine 10, according to the present disclosure. While reference is made to the fan blade sensor system of FIGS. 1A to 3, the method 700 can also be utilized for the fan blade sensor systems 300 and 400, respectively.

In step 705, the method 700 includes rotating the fan 38 (e.g., the fan blades 40). For example, as the turbine engine 10 operates, the fan 38 rotates, as detailed above with respect to FIG. 1A.

In step 710, the method 700 includes sensing the fan blades 40 with the fan blade sensors 104 (e.g., the first fan blade sensor 104*a* and the second fan blade sensor 104*b*). The fan blade sensors 104 sense a time between the fan blades 40 passing the fan blade sensors 104 and a direction of rotation of the fan 38 based on the rotation of the fan blades 40, as detailed above. In particular, the method 700 includes sensing at least one of the first time difference 120 (if the fan blades 40 are at the first blade pitch angle) or the second time difference 122 (if the fan blades 40 are at the second blade pitch angle) between a respective fan blade 40 passing the first fan blade sensor 104*a* and the second fan blade sensor 104*b*.

In step 715, the method 700 includes determining the fan blade pitch angle of the respective fan blade 40 based on the respective fan blade 40 passing the first fan blade sensor 104*a* and the second fan blade sensor 104*b*. In particular, the method 700 includes determining the fan blade pitch angle based on the time difference (e.g., the first time difference 120 or the second time difference 122). In particular, the controller 102 determines the fan blade pitch angle based on the electric voltage spikes from the first fan blade sensor 104*a* and the second fan blade sensor 104*b* (e.g., based on the at least one of the change in magnetic reluctance or the change in pressure). In some embodiments, the controller 102, a portion of the controller 102, or another controller, can be integrated within the fan blade sensors 104 such that the fan blade sensors 104 determine the fan blade pitch angle based on the at least one of the change in magnetic reluctance or the change in pressure from the first fan blade sensor 104*a* and the second fan blade sensor 104*b*.

In step 720, the method 700 includes controlling one or more components of the turbine engine 10 based on the fan blade pitch of the fan blades 40. For example, the method 700 includes controlling at least one of the fuel flow rate of the fuel or the slew rate of the plurality of fan blades 40, as detailed above, based on the fan blade pitch angle of the fan blades 40. In some embodiments, the measured fan blade pitch is part of a closed loop system to control the fan blade pitch angle. In some embodiments, a thrust reverse system for the turbine engine 10 uses the measured fan blade pitch when changing from forward thrust to reverse thrust. In some embodiments, the method 700 includes varying the pitch angle as the engine thrust is varied. For example, the method 700 includes changing the pitch angle proportionally as the thrust changes (e.g., increases or decreases). In some embodiments, the method 700 includes changing the fan blade pitch to minimize thrust at idle conditions, in order to minimize aircraft brake and tire wear of the aircraft.

Figure 8:
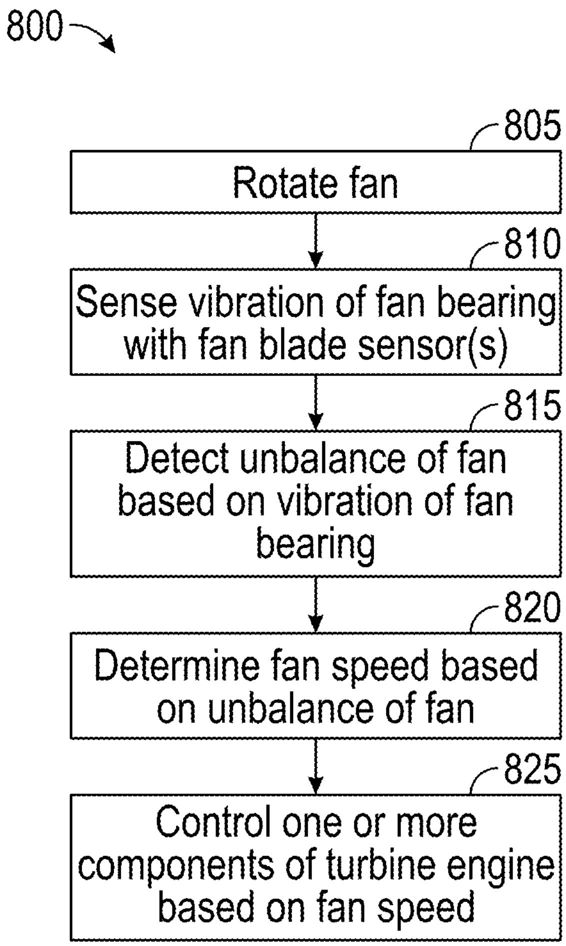
FIG. 8 is a flowchart of a method of operating the fan blade sensor system of FIGS. 1A to 2, according to the present disclosure.

FIG. 8 is a flowchart of a method 800 of operating the fan blade sensor system 400 (FIG. 5) of the turbine engine 10, according to the present disclosure. The methods 600, 700, and 800 can be combined or performed simultaneously as the fan blades 40 rotate.

In step 805, the method 800 includes rotating the fan 38 (e.g., the fan blades 40). For example, as the turbine engine 10 operates, the fan 38 rotates, as detailed above with respect to FIG. 1A.

In step 810, the method 800 includes sensing vibration of the fan bearings 53 with the fan blade sensors 404. In this way, the method 800 includes sensing the vibration of the fan blades 40 with the seeded imbalance 57 with the fan blade sensors 404, as detailed above. The fan blade sensors 404 sense a magnitude of the vibration of the fan bearings 53 (e.g., electric voltage spikes due to the vibration).

In step 815, the method 800 includes detecting the imbalance of the fan 38 based on the vibration of the fan bearings 53. For example, an imbalance will cause the fan 38 (e.g., the fan rotor) to pull in the direction of the heaviest part of the fan 38. The heaviest part will typically be furthest from the longitudinal centerline axis 12, and the opposite side of the fan 38 closest to the longitudinal centerline axis 12. Thus, the vibration of the fan bearings 53 indicates the imbalance when the vibration is above a vibration threshold. Accordingly, the fan blade sensor system 100 determines the imbalance of the fan 38 based on the vibration being greater than the vibration threshold.

In step 820, the method 800 includes determining the fan speed of the fan 38 based on the imbalance of the fan 38. For example, the method 800 includes determining the fan speed based on the passings of the fan blades 40 with the seeded imbalance 57. Alternatively, if there is no seeded imbalance 57, the fan blade sensor system 400 knows the number of fan blades 40 on the fan 38, and determines the fan speed by determining the time for one revolution based on the number of fan blades 40 passing the fan blade sensors 404.

In step 825, the method 800 includes controlling one or more components of the turbine engine 10 based on the fan speed of the fan 38. For example, the method 800 includes controlling at least one of the fuel flow rate of the fuel or the slew rate of the plurality of fan blades 40, as detailed above, based on the fan speed of the fan 38.

Accordingly, the fan blade sensor systems 100, 300, and 400 disclosed herein provide a plurality of fan blade sensors 102, 302, and 402 positioned to sense the fan. In some embodiments, the plurality of fan blade sensors 102, 302, and 402 being located in the nacelle 50 or the bearings 53 allow the fan blade sensors 102, 302, and 402 to be positioned outside (e.g., radially outward) of the lubricant sump 55, and the lubricant sump 55 does not need to be scaled up. Thus, the fan blade sensor systems 100, 300, and 400 of the present disclosure can fit outside or within the tight space of the integral drive engine without affecting at least one of the overall length of the turbine engine 10, the fan radius ratio, or the fan diameter. The fan blade sensors 102, 302, and 402 can sense the fan 38 without having a direct line of sight of the fan 38. The fan blade sensor systems 100, 300, and 400 can determine the fan speed, the fan blade pitch angle, and the flutter using a single type of fan blade sensor to the type, and the positioning, of the fan blade sensors 102, 302, and 402.

Further aspects are provided by the subject matter of the following clauses.

A turbine engine comprising a fan having a plurality of fan blades, a nacelle that surrounds the fan, and a fan blade sensor system comprising a plurality of fan blade sensors disposed in the nacelle to sense the plurality of fan blades as the plurality of fan blades rotates, and a controller that determines a fan speed of the fan based on a rotational time between the fan blades as sensed by the plurality of fan blade sensors.

The turbine engine of the preceding clause, wherein the plurality of fan blade sensors is spaced circumferentially about the nacelle at different circumferential positions, and the controller determines a synchronous flutter based on a rotational time difference between the plurality of fan blades passing the plurality of fan blade sensors at the different circumferential positions.

The turbine engine of any preceding clause, wherein the controller determines an asynchronous flutter of the plurality of fan blades based on a rotational difference in time spacing between different fan blades of the plurality of fan blades as sensed by the plurality of fan blade sensors.

The turbine engine of any preceding clause, wherein the plurality of fan blade sensors includes at least one of variable reluctance sensors, pressure sensors, or vibration sensors.

The turbine engine of the preceding clause, wherein the plurality of fan blades each includes one or more metal fan blade components and the plurality of fan blade sensors sense a change in magnetic reluctance of the one or more metal fan blade components as each of the plurality of fan blades pass the plurality of fan blade sensors.

The turbine engine of any preceding clause, further comprising a fan shaft that supports the plurality of fan blades, and one or more fan bearings that rotationally supports the fan shaft, and the fan blade sensor system includes one or more fan blade sensors positioned on the one or more fan bearings to sense a vibration of the fan bearing from the plurality of fan blades.

The turbine engine of the preceding clause wherein the controller determines an imbalance of the fan based on the vibration sensed by the one or more fan blade sensors on the one or more fan bearings.

The turbine engine of any preceding clause, wherein the plurality of fan blade sensors includes a first fan blade sensor and a second fan blade sensor positioned at a same circumferential location on the nacelle, the second fan blade sensor being axially spaced from the first fan blade sensor.

The turbine engine of the preceding clause, wherein the first fan blade sensor is positioned to sense a leading edge of the plurality of fan blades.

The turbine engine of the preceding clause, wherein the second fan blade sensor is positioned to sense a trailing edge of the plurality of fan blades.

The turbine engine of any preceding clause, wherein the controller determines a fan blade pitch angle of the plurality of fan blades based on each of the plurality of fan blades passing the first fan blade sensor and the second fan blade sensor.

The turbine engine of the preceding clause, wherein the controller determines the fan blade pitch angle based on a time difference between the first fan blade sensor sensing the plurality of fan blades and the second fan blade sensor sensing the plurality of fan blades.

The turbine engine of the preceding clause, wherein the time difference includes a first time difference between the first fan blade sensor sensing a tip of the plurality of fan blades and the second fan blade sensor sensing the tip of the plurality of fan blades indicating the plurality of fan blades are at a first fan blade pitch angle.

The turbine engine of the preceding clause, wherein the time difference includes a second time difference between the first fan blade sensor sensing the tip of the plurality of fan blades and the second fan blade sensor sensing the tip indicating the plurality of fan blades are at a second fan blade pitch angle different than the first fan blade pitch angle.

A method of operating the turbine engine of any preceding clause, the method comprising rotating the plurality of fan blades, sensing rotation of the plurality of fan blades with the plurality of fan blade sensors, determining the fan speed of the fan based on the rotation of the plurality of fan blades, and controlling one or more components of the turbine engine based on the fan blade pitch of the plurality of fan blades.

The method of the preceding clause, wherein the plurality of fan blade sensors is spaced circumferentially about the nacelle at different circumferential positions, and the method further comprises determining a synchronous flutter based on a rotational time difference between the plurality of fan blades passing the plurality of fan blade sensors at the different circumferential positions.

The method of any preceding clause, further comprising determining an asynchronous flutter of the plurality of fan blades based on a difference in time spacing between different fan blades of the plurality of fan blades as sensed by the plurality of fan blade sensors.

The method of any preceding clause, wherein the plurality of fan blade sensors includes at least one of variable reluctance sensors, pressure sensors, or vibration sensors.

The method of any preceding clause, wherein the plurality of fan blades each includes one or more metal fan blade components, and the method further comprises sensing a change in magnetic reluctance of the one or more metal components as each of the plurality of fan blades passes the plurality of fan blade sensors.

The method of any preceding clause, wherein the turbine engine includes a fan shaft that supports the plurality of fan blades, and one or more fan bearings that rotationally supports the fan shaft, and the fan blade sensor system includes one or more fan blade sensors positioned on the one or more fan bearings to sense a vibration of the fan bearing from the plurality of fan blades.

The method of any preceding clause, further comprising determining an imbalance of the fan based on the vibration sensed by the one or more fan blade sensors on the one or more fan bearings.

The method of any preceding clause, wherein the plurality of fan blade sensors includes a first fan blade sensor and a second fan blade sensor positioned at a same circumferential location on the nacelle, the second fan blade sensor being axially spaced from the first fan blade sensor.

The method of any preceding clause, wherein the first fan blade sensor is positioned to sense a leading edge of the plurality of fan blades.

The method of any preceding clause, wherein the second fan blade sensor is positioned to sense a trailing edge of the plurality of fan blades.

The method of any preceding clause, further comprising determining a fan blade pitch angle of the plurality of fan blades based on each of the plurality of fan blades passing the first fan blade sensor and the second fan blade sensor.

The method of any preceding clause, further comprising determining the fan blade pitch angle based on a rotational time difference between the first fan blade sensor sensing the plurality of fan blades and the second fan blade sensor sensing the plurality of fan blades.

The method of any preceding clause, wherein the time difference includes a first time difference between the first fan blade sensor sensing a tip of the plurality of fan blades and the second fan blade sensor sensing the tip of the plurality of fan blades indicating a first fan blade pitch angle.

The method of any preceding clause, wherein the time difference includes a second time difference between the first fan blade sensor sensing the tip of the plurality of fan blades and the second fan blade sensor sensing the tip indicating a second fan blade pitch angle different than the first fan blade pitch angle.

A method of operating the turbine engine of any preceding clause, the method comprising rotating the plurality of fan blades, sensing rotation of the plurality of fan blades with the first fan blade sensor and the second fan blade sensor, determining a fan blade pitch angle of the plurality of fan blades based on each of the plurality of fan blades passing the first fan blade sensor and the second fan blade sensor, and controlling one or more components of the turbine engine based on the fan blade pitch angle of the plurality of fan blades.

The method of any preceding clause, wherein the first fan blade sensor is positioned to sense a leading edge of the plurality of fan blades.

The method of any preceding clause, wherein the second fan blade sensor is positioned to sense a trailing edge of the plurality of fan blades.

The method of any preceding clause, further comprising determining the fan blade pitch angle based on a time difference between the first fan blade sensor sensing the plurality of fan blades and the second fan blade sensor sensing the plurality of fan blades.

The method of any preceding clause, wherein the time difference includes a first time difference between the first fan blade sensor sensing a tip of the plurality of fan blades and the second fan blade sensor sensing the tip of the plurality of fan blades indicating a first fan blade pitch angle.

The method of any preceding clause, wherein the time difference includes a second time difference between the first fan blade sensor sensing the tip of the plurality of fan blades and the second fan blade sensor sensing the tip indicating a second fan blade pitch angle different than the first fan blade pitch angle.

The method of any preceding clause, further comprising controlling at least one of a fuel flow rate of fuel in the turbine engine or a slew rate of the plurality of fan blades.

A turbine engine comprising a fan having a fan shaft and a plurality of fan blades coupled to the fan shaft, one or more fan bearings that rotationally support the fan shaft, and a fan blade sensor system comprising one or more fan blade sensors disposed on the one or more fan bearings to sense a vibration of the fan bearing from the plurality of fan blades as the plurality of fan blades rotates.

The turbine engine of the preceding clause, wherein at least one of the plurality of fan blades includes a seeded imbalance that causes the vibration.

The turbine engine of any preceding clause, wherein the fan blade sensor system includes a controller that determines an imbalance of the fan based on the vibration sensed by the one or more fan blade sensors on the one or more fan bearings.

The turbine engine of the preceding clause, wherein the controller determines a fan speed of the fan based on the imbalance.

The turbine engine of the preceding clause, wherein the controller controls one or more components of the turbine engine based on the fan speed of the fan.

The turbine engine of the preceding clause, wherein the controller controls at least one of a fuel flow rate of fuel in the turbine engine or a slew rate of the plurality of fan blades.

A method of operating the turbine engine of any preceding clause, the method comprising rotating the plurality of fan blades, sensing vibration of the plurality of fan blades with the one or more fan blade sensors on the one or more fan bearings, determining the imbalance of the fan based on the vibration, and controlling one or more components of the turbine engine based on the imbalance of the fan.

The method of the preceding clause, wherein at least one of the plurality of fan blades includes a seeded imbalance that causes the vibration.

The method of any preceding clause, further comprising determining a fan speed of the fan based on the imbalance.

The method of any preceding clause, further comprising controlling one or more components of the turbine engine based on the fan speed of the fan.

The method of any preceding clause, further comprising controlling at least one of a fuel flow rate of fuel in the turbine engine or a slew rate of the plurality of fan blades.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A turbine engine comprising:

a fan having a plurality of fan blades;

a nacelle that surrounds the fan; and a fan blade sensor system comprising a plurality of fan blade sensors disposed in the nacelle to sense the plurality of fan blades as the plurality of fan blades rotates, and a controller that determines an asynchronous flutter of the plurality of fan blades based on a rotational difference in time spacing between different fan blades of the plurality of fan blades as sensed by the plurality of fan blade sensors, and, when the controller determines the asynchronous flutter of the plurality of fan blades, the controller determines a fan speed of the fan based on a passing time of a single fan blade of the plurality of fan blades on consecutive revolutions to minimize noise.

2. The turbine engine of claim 1, wherein the plurality of fan blade sensors is spaced circumferentially about the nacelle at different circumferential positions, and the controller determines a synchronous flutter based on a rotational time difference between the plurality of fan blades passing the plurality of fan blade sensors at the different circumferential positions.

3. The turbine engine of claim 1, wherein the plurality of fan blade sensors includes at least one of variable reluctance sensors, pressure sensors, or vibration sensors.

4. The turbine engine of claim 3, wherein the plurality of fan blades each includes one or more metal fan blade components and the plurality of fan blade sensors sense a change in magnetic reluctance of the one or more metal fan blade components as each of the plurality of fan blades pass the plurality of fan blade sensors.

5. The turbine engine of claim 1, further comprising a fan shaft that supports the plurality of fan blades, and one or more fan bearings that rotationally supports the fan shaft, and the fan blade sensor system includes one or more fan blade sensors positioned on the one or more fan bearings to sense a vibration of the fan bearing from the plurality of fan blades.

6. The turbine engine of claim 5, wherein the controller determines an imbalance of the fan based on the vibration sensed by the one or more fan blade sensors on the one or more fan bearings.

7. The turbine engine of claim 1, wherein the plurality of fan blade sensors includes a first fan blade sensor and a second fan blade sensor positioned at a same circumferential location on the nacelle, the second fan blade sensor being axially spaced from the first fan blade sensor.

8. The turbine engine of claim 7, wherein the first fan blade sensor is positioned to sense a leading edge of the plurality of fan blades.

9. The turbine engine of claim 8, wherein the second fan blade sensor is positioned to sense a trailing edge of the plurality of fan blades.

10. The turbine engine of claim 7, wherein the controller determines a fan blade pitch angle of the plurality of fan blades based on each of the plurality of fan blades passing the first fan blade sensor and the second fan blade sensor.

11. The turbine engine of claim 10, wherein the controller determines the fan blade pitch angle based on a time difference between the first fan blade sensor sensing the plurality of fan blades and the second fan blade sensor sensing the plurality of fan blades.

12. The turbine engine of claim 11, wherein the time difference includes a first time difference between the first fan blade sensor sensing a tip of the plurality of fan blades and the second fan blade sensor sensing the tip of the plurality of fan blades indicating the plurality of fan blades are at a first fan blade pitch angle.

13. The turbine engine of claim 12, wherein the time difference includes a second time difference between the first fan blade sensor sensing the tip of the plurality of fan blades and the second fan blade sensor sensing the tip indicating the plurality of fan blades are at a second fan blade pitch angle different than the first fan blade pitch angle.

14. A method of operating the turbine engine of claim 1, the plurality of fan blade sensors including a first fan blade sensor and a second fan blade sensor positioned at a same circumferential location on the nacelle, the second fan blade sensor being axially spaced from the first fan blade sensor, and the method comprising:

rotating the plurality of fan blades;

sensing rotation of the plurality of fan blades with the first fan blade sensor and the second fan blade sensor;

determining a fan blade pitch angle of the plurality of fan blades based on each of the plurality of fan blades passing the first fan blade sensor and the second fan blade sensor; and controlling one or more components of the turbine engine based on the fan blade pitch angle of the plurality of fan blades.

15. The method of claim 14, further comprising controlling at least one of a fuel flow rate of fuel in the turbine engine or a slew rate of the plurality of fan blades.

16. The method of claim 14, wherein the first fan blade sensor is positioned to sense a leading edge of the plurality of fan blades, and the second fan blade sensor is positioned to sense a trailing edge of the plurality of fan blades.

17. The method of claim 14, further comprising determining the fan blade pitch angle based on a time difference between the first fan blade sensor sensing the plurality of fan blades and the second fan blade sensor sensing the plurality of fan blades.

18. The method of claim 17, wherein the time difference includes a first time difference between the first fan blade sensor sensing a tip of the plurality of fan blades and the second fan blade sensor sensing the tip of the plurality of fan blades indicating a first fan blade pitch angle.

19. The method of claim 18, wherein the time difference includes a second time difference between the first fan blade sensor sensing the tip of the plurality of fan blades and the second fan blade sensor sensing the tip indicating a second fan blade pitch angle different than the first fan blade pitch angle.

20. The method of claim 14, wherein the plurality of fan blade sensors is spaced circumferentially about the nacelle at different circumferential positions, and the method further comprises determining a synchronous flutter based on a rotational time difference between the plurality of fan blades passing the plurality of fan blade sensors at the different circumferential positions.

* * * * *